US008510744B2

(12) United States Patent
Dallman et al.

(10) Patent No.: US 8,510,744 B2

(45) Date of Patent: Aug. 13, 2013

(54) USING RESOURCE DEFINING ATTRIBUTES TO ENHANCE THREAD SCHEDULING IN PROCESSORS

(75) Inventors: John Gordon Dallman, Cambridge (GB); Peter Philip Lonsdale Nanson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 576 days.

(21) Appl. No.: 12/549,057

(22) Filed: Aug. 27, 2009

(65) Prior Publication Data

US 2010/0218194 A1 Aug. 26, 2010

Related U.S. Application Data

(60) Provisional application No. 61/155,036, filed on Feb. 24, 2009.

(51) Int. Cl.
*G06F 9/46* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | | |
|---|---|---|---|---|
| 5,303,369 A | | 4/1994 | Borcherding | |
| 5,838,968 A | | 11/1998 | Culbert | |
| 6,754,219 B1 | * | 6/2004 | Cain et al. | 370/401 |
| 7,222,343 B2 | * | 5/2007 | Heyrman et al. | 718/100 |
| 7,587,558 B1 | * | 9/2009 | Smith et al. | 711/152 |
| 2005/0044205 A1 | | 2/2005 | Backman | |
| 2005/0154861 A1 | * | 7/2005 | Arimilli et al. | 712/216 |
| 2006/0212871 A1 | | 9/2006 | Cook | |

OTHER PUBLICATIONS

"GetLogicalProcessorInformation Function", 2009 Microsoft Corporation, 4 pages.

"Multiple Processors", 2009 Microsoft Corporation, 2 pages.

Bradford Nichols, et al., "Pthreads Programming", 1996, p. 110-115.

Sanja Vranes, Different Approaches to Real-Time Application Allocation to a Multiprocessor System, Institute "Mihailo Pupin", Belgrad, Yugoslavia, Jun. 14, 1989, pp. 18-23.

Karsten Schwan & Anita K. Jones, Special Feature: Specifying Resource Allocation for the Cm* Multiprocessor, Ohio State University, vol. 3, No. 3, May 1, 1986, pp. 60-70.

* cited by examiner

*Primary Examiner* — Mengyao Zhe

(57) ABSTRACT

A method for controlling a data processing system, a data processing system executing a similar method, and a computer readable medium with instructions for a similar method. The method includes receiving, by an operating system executing on a data processing system, an execution request from an application, the execution request including at least one resource-defining attribute corresponding to an execution thread of the application. The method also includes allocating processor resources to the execution thread by the operating system according to the at least one resource-defining attribute, and allowing execution of the execution thread on the data processing system according to the allocated processor resources.

18 Claims, 3 Drawing Sheets

USING RESOURCE DEFINING ATTRIBUTES TO ENHANCE THREAD SCHEDULING IN PROCESSORS

CROSS-REFERENCE TO OTHER APPLICATION

This application claims priority from U.S. Provisional Patent Application 61/155,036, filed Feb. 24, 2009, which is hereby incorporated by reference.

TECHNICAL FIELD

The present disclosure is directed, in general, to microprocessor operations.

BACKGROUND OF THE DISCLOSURE

Data processing systems use one or more processors, each of which may include one or more processor cores. Applications and operating systems running on these processors may use multiple threads for execution.

SUMMARY OF THE DISCLOSURE

Various embodiments include a method for controlling a data processing system, a data processing system executing a similar method, and a computer readable medium with instructions for a similar method. The method includes receiving, by an operating system executing on a data processing system, an execution request from an application, the execution request including at least one resource-defining attribute corresponding to an execution thread of the application. The method also includes allocating processor resources to the execution thread by the operating system according to the at least one resource-defining attribute, and allowing execution of the execution thread on the data processing system according to the allocated processor resources.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
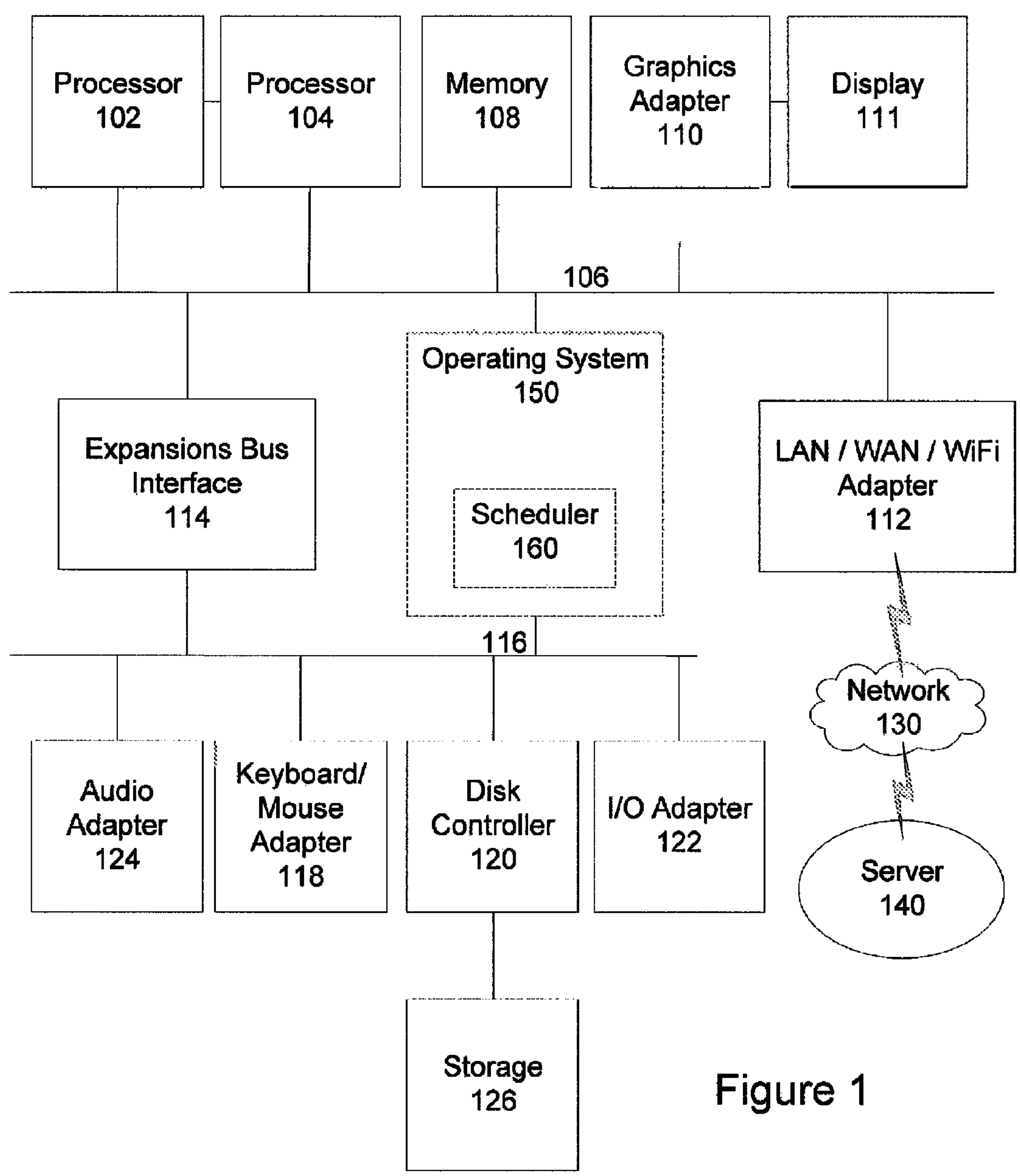
FIG. 1 depicts a block diagram of a data processing system in accordance with disclosed embodiments.
Figure 2:
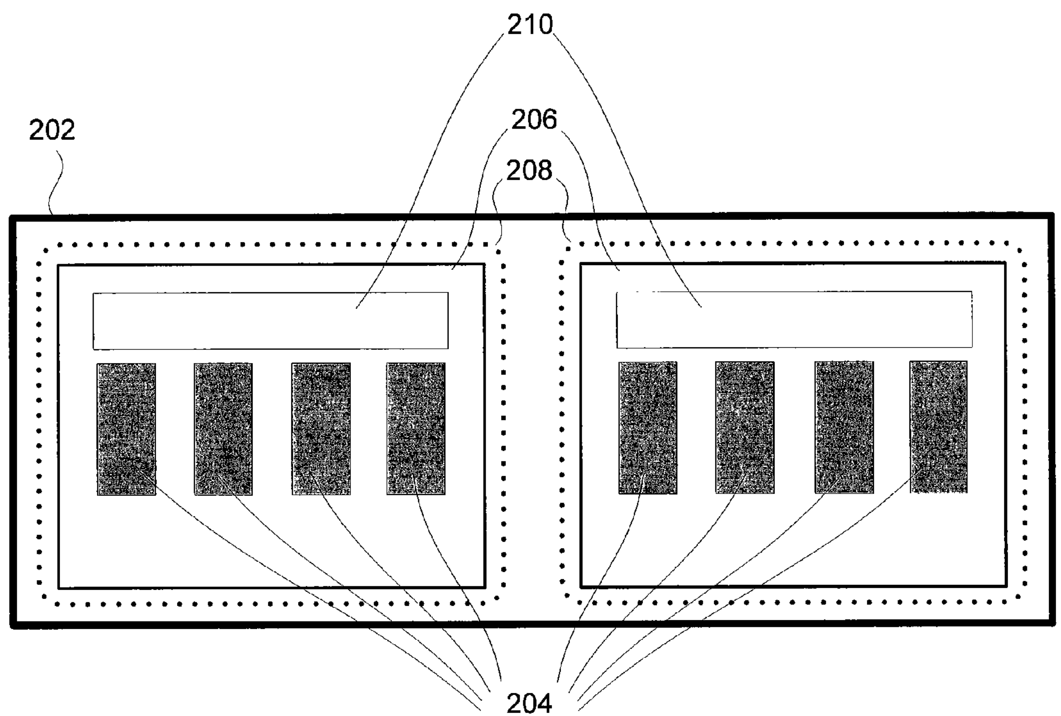
FIG. 2 depicts a simplified block diagram of a multiprocessor that can be used in accordance with disclosed embodiments.
Figure 3:
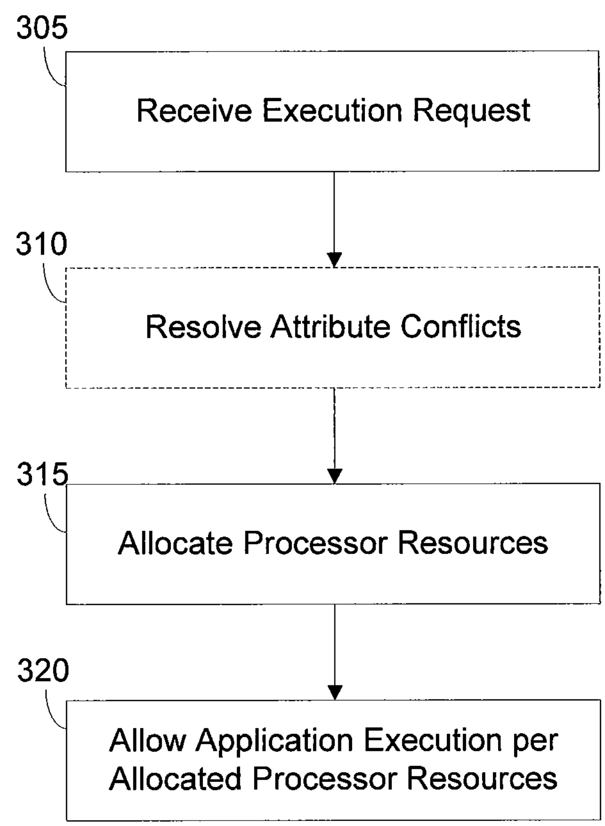
FIG. 3 depicts a flowchart in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Computers with multiple processors have existed for many years, while computers with multi-core processors are relatively new. One known approach programming computers with multiple processors is symmetric multi-processing (SMP). This term isn't quite accurate for computers with more than one multi-core processor, for which the term "Not Quite SMP" (NQSMP) has been coined, an example of which is described below. Simultaneous multi-threading (SMT) is another approach to application execution in these systems, and these various approaches in programming and in the ways that memory is connected to processors have made it difficult for applications to consistently extract the maximum performance from recent computer designs.

Following are short description of the usual meanings of some of the technical terms which are used in the present application; however, those of ordinary skill will recognize whether the context requires a different meaning. Additional definitions can be found in the standard technical dictionaries and journals.

A processor core is what used to be thought of as a complete processor: a collection of circuits that fetches instructions from memory and executes them. It normally includes registers, and several execution units. Types of execution unit include the arithmetic logic unit (ALU), the floating-point unit (FPU) for arithmetic on floating-point numbers, and in some cores, other types of units, such as a specialised unit for branch instructions, or a cryptographic unit for rapid encryption and decryption of data. Some cores contain multiple execution units of the same type, which can give improved performance provided that the core can make proper use of them.

Cores also contain processor cache. Because modern processors run at very high speeds, and low-cost, high-capacity computer memory is not fast enough for them, small amounts of very high-speed memory are built into a processor, and used to store recently-used data, which is likely to be required again. This improves the overall performance of modern computers considerably.

Some cores run a single hardware thread, but other can run two or more hardware threads at the same time. This is called "simultaneous multi-threading", or SMT. Such a core contains more than one set of registers, and can execute more than one instruction stream at the same time. However, the core's execution units are shared amongst the hardware threads in some manner. If the hardware threads had entirely separate sets of execution units, they would be separate cores, rather than hardware threads.

Modern programs are run as one or more application threads. By default, a program has one application thread, but modern programming environments allow the programmer to create additional application threads, and provide facilities for data locking, to control application thread's access to the programs data.

A memory bus connects a socket to the computer's main memory, or part of it. Some computers with multiple sockets connect the same memory bus to all of them; others have separate memory busses for each socket. The first technique is simpler, but the second allows for the separate busses to be used simultaneously, increasing the amount of data that can be accessed per second. Other systems have multiple memory busses per socket. This allows for enough memory access to feed many cores, improving performance, but doesn't change the basic idea.

In computers that are intended to provide SMP (or NQSMP) programming, and have per-socket memory busses, there has to be some way for each socket to access memory that is connected to a different socket. This is done either by connecting the memory busses in some way, such as a "snoop filter", or by providing a special communication channel between the processor sockets that allows one processor to ask another to access data as a proxy for the processor that originated the request. This technique is commonly known as Non-Uniform Memory Access (NUMA).

A computer system, for the purposes of this document, is bounded by the limits of its memory busses. Types of computer exist that have several entirely disjoint memory systems, but the means used to connect them are quite different from memory busses.

An operating system is a "master control program", which controls the running of application programs on its computer. Modern operating systems are quite flexible, and a single version of an operating system is capable of running on many different configurations of hardware, adapting itself to suit them. It tries to provide a standardized environment to programs, which can in some ways limit their ability to take best advantage of the hardware.

A time-sharing operating system expects to run many programs at once, and attempts to share the computing power between then in some "fair" way. This approach originated on large multi-user computer systems. Modern personal computer operating systems (Windows, Linux, Mac OS X) follow a similar approach, even though they are mainly intended for use by a single person, because the time-sharing approach is useful for running several programs at the same time, and for creating "server" versions of these operating systems.

A real-time operating system is generally intended to run programs that control production lines or other process machinery. Here, notions of "fairness" are irrelevant, and the most important part of the computer's task is to respond promptly (hence "real-time") to external events.

Many processors use multiple cores, and multiple threads on those cores. Larger systems have multiple processor sockets, and some processor packages contain multiple processor dies. The effect of this is that the time needed for communication between two cores can vary significantly. For example, consider a dual-socket system where each socket has two processor dies, each with two cores. The fastest-communicating pairs of cores are those on the same die, with cores in the same socket but on different dies taking somewhat longer. The slowest communication comes between cores in different sockets, since they have to communicate via the system motherboard, and, in this case, a "snoop filter". This variation in speed, and the consequently imperfect symmetry of the processing, constitutes "Not Quite SMP", or NQSMP. Slow communication slows down software that is using several processor cores, since communication is necessary for the "locking" that controls access to shared data.

The situation is even more complex when the processor memory busses and caches are considered. In the example system, each die has a shared outermost level of cache. The two caches in a single socket share a single memory bus, while caches in separate sockets usually have separate memory busses.

Benchmark testing on such processors, using an application requiring a great deal of memory, both for code and data, and threads that share read access to the same global data pool, produces interesting results. There is a considerable amount of locking, which is inevitable when data structures are being shared. The fastest two-thread performance came, naturally enough, when using the two cores of a single die, but the fastest four-thread performance came from using two pairs of cores in separate sockets. The increase in usable memory bandwidth made up for the slower communications between sockets; using all four cores of a single socket was about 15% slower.

Symmetric Multi-Threading (SMT) is useful for some codes, but not for all. SMT threads sunning on the same processor core normally have excellent speed for inter-thread communication.

Known threading systems are not designed with the exploitation of multi-core processors as the primary objective. Multi-tasking operating systems can make very good use of threads for simplifying the operating system code, and for running real-time processing; these facilities were made available for programs running on the operating systems so that they could be exploited where appropriate.

Many operating systems have "processor affinity", a facility for marking threads or processes to run on particular processor cores. Some operating systems, such as those providing threading in accordance with the IEEE POSIX® standards, provide thread attributes that allow threads to be marked as belonging to a particular "scheduling domain", allowing them to be allocated to a particular processor or set of processors. Applications that have been written to run on a specific individual machine can fairly readily be set up to match that machine, and used with affinity or scheduling domains. However, in most commercial applications, customization for individual customers is limited or nonexistent. Programs can also make use of facilities for discovering the number and kind of processor cores available, and, if the program was written to use the specific number and kind of processors available, determine the best way to allocate their threads to cores. However, this requires application programs to contain detailed information about hardware. This is undesirable, especially because new kinds and models of hardware are constantly being developed. More automatic ways of running software optimally are disclosed herein.

As disclosed herein, an application can determine a best strategy core-selection for itself, running in isolation, on a given set of hardware. However, it doesn't know what else is running. Two copies of the same program that, in ignorance of each other, use the same strategy to decide on the best combination of cores for them to use, are likely to produce the same answer, and thus compete for all the cores they are using, which is a worst-case solution. It's fairly difficult for programs to determine what cores other programs are using, for valid security reasons, so in some embodiments, the operating system, which is in control, performs the processes described herein to do the job.

FIG. 1 depicts a block diagram of a data processing system in accordance with disclosed embodiments. The data processing system depicted includes one or more processors 102/104, connected directly or indirectly to a local system bus 106, and each of processors 102/104 can include one or more processor cores, caches, and other processor components known to those of skill in the art and described herein, including one or more dies or sockets. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

While not a physical element of data processing system 100, for clarity of description, operating system 150, including scheduler 160, is shown here in communication with local system bus 106 and I/O bus 116. Those of skill in the art will recognize that the operating system 150 is stored in either or both of memory 108 and storage 106, and executes on processors 102/104. Operating system 150 controls processor use and thread allocation as described in more detail below, among other tasks known to those of skill in the art. One of various commercial operating systems, such as one of the Unix/Linux family of operating systems, with or without a POSIX API, or a version of Microsoft Windows™, a product of Microsoft Corporation located in Redmond, Wash. may be employed if suitably modified as described herein. The operating system is modified or created in accordance with the present disclosure as described. The operating system can instrospect the hardware of the data processing system to determine the structure and number of processors 102/104 and their respective cores, along with other hardware configuration information, using techniques known to those of skill in the art.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIG. 2 depicts a simplified block diagram of a multiprocessor 202 that can be used in accordance with disclosed embodiments, for example as processors 102/104 in FIG. 1. In this example, multiprocessor 202 includes four cores 204 on each die 206 in each of two sockets 208. Such a processor can have separate memory busses, multiple speeds and an NQSMP capability; assume in this example that each processor has four cores, which share an outermost level of cache 210. Each core 204 may also have its own cache. Each processor also has a separate memory bus, although the processors can access the memory of other processors. Of course, those of skill in the art will recognize that the techniques disclosed herein apply as well to other multiprocessor or multiple-core architectures. In general a system with both multiple cores per die, and multiple dies or sockets, will be an NQSMP system rather than an SMP system.

In disclosed embodiments, it is desirable for an operating system, such as operating system 150, to be able to choose a combination of cores for a program this is multi-threaded to gain more access to CPU power, which will suit the characteristics of the program, within the limitations of the hardware and the other programs running at the same time.

When a thread is created, a conventional operating system has little information about a process when executing the thread. The operating system doesn't know if this is a thread created for program structure reasons, or to access more CPU power. The operating system doesn't know how frequently threads will want to use locks, or how much memory bandwidth they will need. While the operating system can try to observe all of these things, collecting and interpreting the relevant statistics takes time, and at least some of that time will come from the threads themselves, imposing system overheads.

One approach for more efficient thread execution would be for an application that wanted to use threads to access more CPU power to describe its needs to the operating system, which would reply with a list of sensible configurations that could be provided.

For example, a request could be placed for four threads, with good locking performance between them all, and the maximum memory bandwidth available. In a system such as that depicted in FIGS. 1 and 2, the operating system would reply that four threads with good locking performance could be had (all running on one processor, using the shared cache), or two pairs of threads with good locking within the pairs and twice the total memory bandwidth. The application would then make its choice, and the OS would assume that the threads it started should be fitted into that model.

A preferred way to provide hints to the scheduler, such as scheduler 160 of operating system 150, would be by providing information associated with each thread, as it is created. This could be implemented as new or additional thread scheduling attributes in an operating system such as the Unix/Linux family of operating systems, with or without a POSIX API, or in a Microsoft Windows® operating system, or in other operating systems known to those of skill in the art.

Disclosed embodiments can include some or all of the sample resource-defining attributes described below. Of course, those of skill in the art recognize that the names of the exemplary attributes are arbitrary, and any name could be used with similar functionality.

THREAD_TO_ACCESS_CPU: A thread with this attribute is given access to more CPU power, when possible. Threads without this attribute can remain, by default, on the same core as the thread that created them; threads with it should be started on a different core. The application should be allocated a greater amount of dedicated processor power.

As used herein, a "greater amount" will vary in particular implementations, but generally refers to allocating or requiring more of the resource than other threads without the specific attribute.

THREAD_HIGH_LOCKS: A thread with this attribute will compete for locks with other threads of the same process or application. There is thus an advantage to keeping the threads running with a shared level of cache, so that the locks will stay in that cache.

THREAD_LOCK_GROUP_N (for N=1 to 10, for example): Threads with this attribute will lock against each other frequently, and should thus be run in such a way as to make this easy. One example would be running them with a shared level of cache. This is a more sophisticated alternative to THREAD_HIGH_LOCKS.

THREAD_HIGH_MEMORY: A thread with this attribute uses a lot of memory bandwidth. Such threads should preferably be run in such a way as to use different memory busses from each other.

THREAD_HIGH_FPU: A thread with this attribute makes heavy use of floating-point instructions. It is preferable for it not to share a floating-point unit (FPU) with any other thread that has this attribute. Sharing a core's single FPU between several SMT threads is a commonplace feature of SMT processor designs, but is bad for performance if floating-point makes up a large proportion of the work done by the threads.

THREAD_DATA_MEMORY_STREAM: A thread with this attribute indicates the application thread's memory accesses to data are principally stream-orientated: that it normally reads through large areas of memory sequentially. This is useful for giving hints to cache hardware about pre-fetching. In the absence of this attribute, memory accesses may be presumed to be random.

THREAD_DATA_MEMORY_LARGE: A thread with this attribute indicates that the application thread is likely to access large amounts of data, much more than will fit into cache. One use for this is in NUMA systems where the amount of memory to which hardware threads have rapid access varies; it tells the scheduler to put the application thread somewhere that it can access large amounts. Another use for this is in deciding if two application threads can share a core or socket without undue interference: if one has a need for lots of memory and the other doesn't, sharing is more practical than it is for two that both need lots of memory.

THREAD_CODE_MEMORY_STREAM: A thread with this attribute indicates that (a) the application thread is likely to execute a large amount of code, larger than can be expected to fit in the processor cache and (b) the code is likely to be fetched in a similar way to data under THREAD_DATA_MEMORY_STREAM. The preferred behavior of application threads is that they only execute comparatively small amounts of code to fit into processor cache. However, this is not always practical.

THREAD_CODE_MEMORY_RANDOM: A thread with this attribute indicates that the application thread will execute a large amount of code, and that this code is selected in a pattern that is more random than stream-like. It forms a counterpoint to THREAD_CODE_MEMORY_STREAM.

THREAD_MEMORY_BANDWIDTH_LARGE: A thread with this attribute indicates that the application thread will use large amounts of memory bandwidth. Keeping it away from other application threads that do this is advisable, if possible; keeping it away from application threads of different processes that do this is very much advisable.

Resolving contradictory attributes: In some embodiments, the attributes described above may result in conflicting demands among different threads. Rules for resolving their priority include one or more of the following techniques, as in the example described below.

For example, a process running on the exemplary system of FIGS. 1 and 2 creates two, four, six or eight threads, each with
THREAD_TO_ACCESS_CPU,
THREAD_LOCK_GROUP__1,
THREAD_HIGH_MEMORY, and
THREAD_HIGH_FPU.

In this example, since each thread includes the THREAD_TO_ACCESS_CPU attribute, the threads should be run on separate cores. Since the exemplary system has only one thread per core, each thread has a private FPU and THREAD_HIGH_FPU is redundant and can be ignored.

However, each thread also includes the THREAD_LOCK_GROUP__1 and THREAD_HIGH_MEMORY attributes. Those attributes are contradictory: more memory bandwidth can be obtained by spreading the threads evenly over the sockets, but that gives worse locking performance than having them all in one socket. The cases where there are more threads (6 or 8) than cores in a single socket can be resolved by distributing them evenly to get maximum memory bandwidth shared evenly between the threads, which also gives a significant probability that locks will be between threads in the same socket, and thus use the shared cache.

The cases of two threads and four threads, which could stay in a single socket, or get more bandwidth from being split between the sockets, are more challenging. If the system memory is heavily loaded and is swapping, running all the threads in a single socket will throttle the memory bandwidth demands. If the average CPU load is very high, then running the threads distributed over the sockets will move some load to the memory bus, and ease the CPU load.

Without heavy loading of the system, the scheduler has to guess what to do with two or four threads on the example system. Splitting four threads into two pairs seems like a reasonable compromise: some of the locking will be local, and all the bandwidth will be available. For two threads, there isn't much to be guessed, and a random choice will have to be made, unless the characteristics of the hardware suggest a specific scheduling solution.

Special attribute situations: The case of an application built up from separately-developed components, without any one organization having access to the entire source, was mentioned above. The attribute THREAD_LOCK_GROUP_N presents a difficulty since different components may want to have locking groups of their own, and some coordination is needed. One solution is for the component(s) to accept an initialization parameter of the lock group to be used; making this a simple integer helps keep the interfaces simple.

FIG. 3 depicts a flowchart of a process in accordance with disclosed embodiments. Note that, as understood to those of skill in the art, where a step is described as performed by an operating system or application, it may be understood as being performed by the data processing system itself under the control of the operating system or application, as a particular machine configured to perform or execute similar steps.

The operating system of a data processing system receives an execution request from an application executing on the data processing system (step 305). The execution request includes one or more of the resource-defining attributes discussed above, that request specific execution thread processor resources.

The operating system optionally determines and resolves any conflicts between the attributes (step 310).

The operating system allocates processor resources to the execution thread (step 315). Allocation of processor resources can include assigning specific threads to execute on specific processors or cores in the data processing system, and can consider any of the hardware, memory, or architecture considerations discussed above.

The operating system thereafter allows execution of the execution thread according to the allocated processor resources (step 320). Of course, those of skill in the art recognize that the "application" may be a single program, process, or module, or multiple programs, processes, and/or modules, and each of these may execute concurrently, independently, or cooperatively with each other. For example, one process or module of the application may execute to make the execution request to the operating system, and other processes or modules may execute after the processor resources have been allocated and according to those allocations. Each of the programs, processes, and modules may include multiple execution threads.

Disclosed embodiments achieve a technical advantage in that the executing applications run more efficiently, with less likelihood of conflicts, when assigned the resources requested using the attributes described above. By specifying such requirements as memory or cache use, processor dedication, and others as described herein, the data processing system, its operating system. and its applications can perform their tasks much more effectively than in conventional systems. The processes described herein result in an effective configuration change to the data processing system, as hardware resources are specifically allocated to various threads and applications.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for controlling a data processing system, comprising:

receiving, by an operating system executing on a data processing system, an execution request from an application, the execution request including at least one resource-defining attribute corresponding to an execution thread of the application;

resolving, by the operating system, any conflicts between a plurality of the resource-defining attributes of the execution thread, wherein the plurality of resource-defining attributes includes at least two of an attribute indicating that the execution thread should be allocated a greater amount of dedicated processor power, an attribute indicating that the execution thread will compete for locks with other execution threads of the same application, an attribute indicating that the execution thread will compete for locks with other execution threads in a same lock group, an attribute indicating that the execution thread uses a greater amount of memory bandwidth, an attribute indicating that the execution thread uses a greater amount of floating-point instructions, an attribute indicating that the execution thread requires more data than can be stored in a processor cache memory, an attribute indicating that memory accesses of the execution thread are principally stream-orientated, an attribute indicating that the execution thread is likely to access more data than will fit into a cache, or an attribute indicating that the execution thread will execute a large amount of code that is selected in a pattern that is substantially random, and wherein resolving any conflicts includes ignoring redundant resource-defining attributes of the execution thread;

allocating processor resources to the execution thread by the operating system according to the at least one resource-defining attribute; and allowing execution of the execution thread on the data processing system according to the allocated processor resources.

2. The method of claim 1, wherein the at least one resource-defining attribute is the attribute indicating that the execution thread should be allocated a greater amount of dedicated processor power.

3. The method of claim 1, wherein the at least one resource-defining attribute is the attribute indicating that the execution thread will compete for locks with other execution threads of the same application.

4. The method of claim 1, wherein the at least one resource-defining attribute is the attribute indicating that the execution thread uses a greater amount of memory bandwidth.

5. The method of claim 1, wherein the at least one resource-defining attribute is the attribute indicating that the execution thread uses a greater amount of floating-point instructions.

6. The method of claim 1, wherein the at least one resource-defining attribute is the attribute indicating that the execution thread requires more data than can be stored in a processor cache memory.

7. A data processing system comprising a memory and one or more processors, each processor having one or more cores, the data processing system configured to execute the steps of:

receiving an execution request from an application, the execution request including at least one resource-defining attribute corresponding to an execution thread of the application;

resolving any conflicts between a plurality of the resource-defining attributes of the execution thread, wherein the plurality of resource-defining attributes includes at least two of an attribute indicating that the execution thread should be allocated a greater amount of dedicated processor power, an attribute indicating that the execution thread will compete for locks with other execution threads of the same application, an attribute indicating that the execution thread will compete for locks with other execution threads in a same lock group, an attribute indicating that the execution thread uses a greater amount of memory bandwidth, an attribute indicating that the execution thread uses a greater amount of floating-point instructions, an attribute indicating that the execution thread requires more data than can be stored in a processor cache memory, an attribute indicating that memory accesses of the execution thread are principally stream-orientated, an attribute indicating that the execution thread is likely to access more data than will fit into a cache, or an attribute indicating that the execution thread will execute a large amount of code that is selected in a pattern that is substantially random, and wherein resolving any conflicts includes ignoring redundant resource- defining attributes of the execution thread;

allocating processor resources to the execution thread according to the at least one resource-defining attribute; and executing the execution thread according to the allocated processor resources.

8. The data processing system of claim 7, wherein the at least one resource-defining attribute is the attribute indicating that the execution thread should be allocated a greater amount of dedicated processor power.

9. The data processing system of claim 7, wherein the at least one resource-defining attribute is the attribute indicating that the execution thread will compete for locks with other execution threads of the same application.

10. The data processing system of claim 7, wherein the at least one resource-defining attribute is the attribute indicating that the execution thread uses a greater amount of memory bandwidth.

11. The data processing system of claim 7, wherein the at least one resource-defining attribute is the attribute indicating that the execution thread uses a greater amount of floating-point instructions.

12. The data processing system of claim 7, wherein the at least one resource-defining attribute is the attribute indicating that the execution thread requires more data than can be stored in a processor cache memory.

13. A non-transitory computer readable storage medium encoded with instructions for controlling a data processing system, comprising:

instructions for receiving, by an operating system executing on a data processing system, an execution request from an application, the execution request including at least one resource-defining attribute corresponding to an execution thread of the application;

instructions for resolving, by the operating system, any conflicts between a plurality of the resource-defining attributes of the execution thread, wherein the plurality of resource-defining attributes includes at least two of an attribute indicating that the execution thread should be allocated a greater amount of dedicated processor power, an attribute indicating that the execution thread will compete for locks with other execution threads of the same application, an attribute indicating that the execution thread will compete for locks with other execution threads in a same lock group, an attribute indicating that the execution thread uses a greater amount of memory bandwidth, an attribute indicating that the execution thread uses a greater amount of floating-point instructions, an attribute indicating that the execution thread requires more data than can be stored in a processor cache memory, an attribute indicating that memory accesses of the execution thread are principally stream-orientated, an attribute indicating that the execution thread is likely to access more data than will fit into a cache, or an attribute indicating that the execution thread will execute a large amount of code that is selected in a pattern that is substantially random, and wherein resolving any conflicts includes ignoring redundant resource-defining attributes of the execution thread;

instructions for allocating processor resources to the execution thread by the operating system according to the at least one resource-defining attribute; and instructions for allowing execution of the execution thread on the data processing system according to the allocated processor resources.

14. The computer-readable medium of claim 13, wherein the at least one resource-defining attribute is the attribute indicating that the execution thread should be allocated a greater amount of dedicated processor power.

15. The computer-readable medium of claim 13, wherein the at least one resource-defining attribute is the attribute indicating that the execution thread will compete for locks with other execution threads of the same application.

16. The computer-readable medium of claim 13, wherein the at least one resource-defining attribute is the attribute indicating that the execution thread uses a greater amount of memory bandwidth.

17. The computer-readable medium of claim 13, wherein the at least one resource-defining attribute is the attribute indicating that the execution thread uses a greater amount of floating-point instructions.

18. The computer-readable medium of claim 13, wherein the at least one resource-defining attribute is the attribute indicating that the execution thread requires more data than can be stored in a processor cache memory.

* * * * *